July 4, 1933.  W. H. GREEN  1,916,367
PROCESS FOR SOFTENING WATER
Original Filed July 19, 1924   2 Sheets-Sheet 1
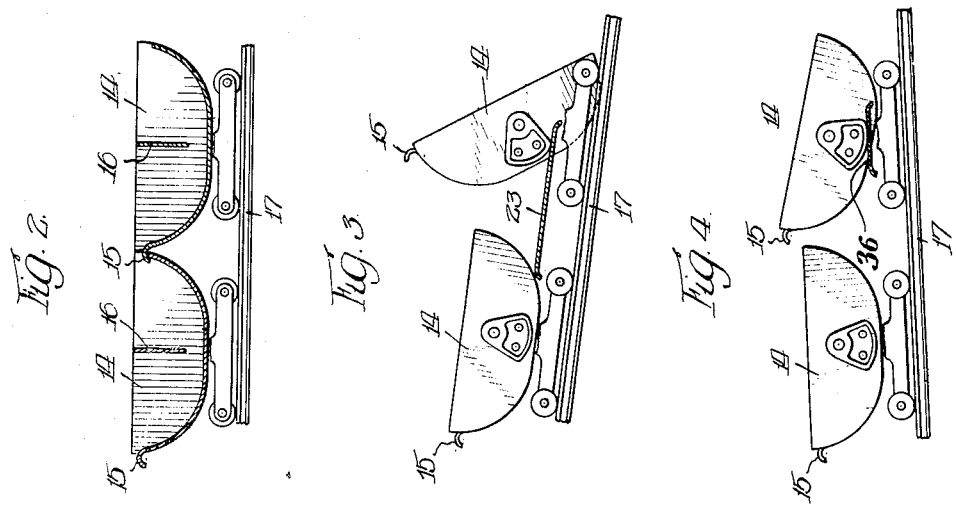
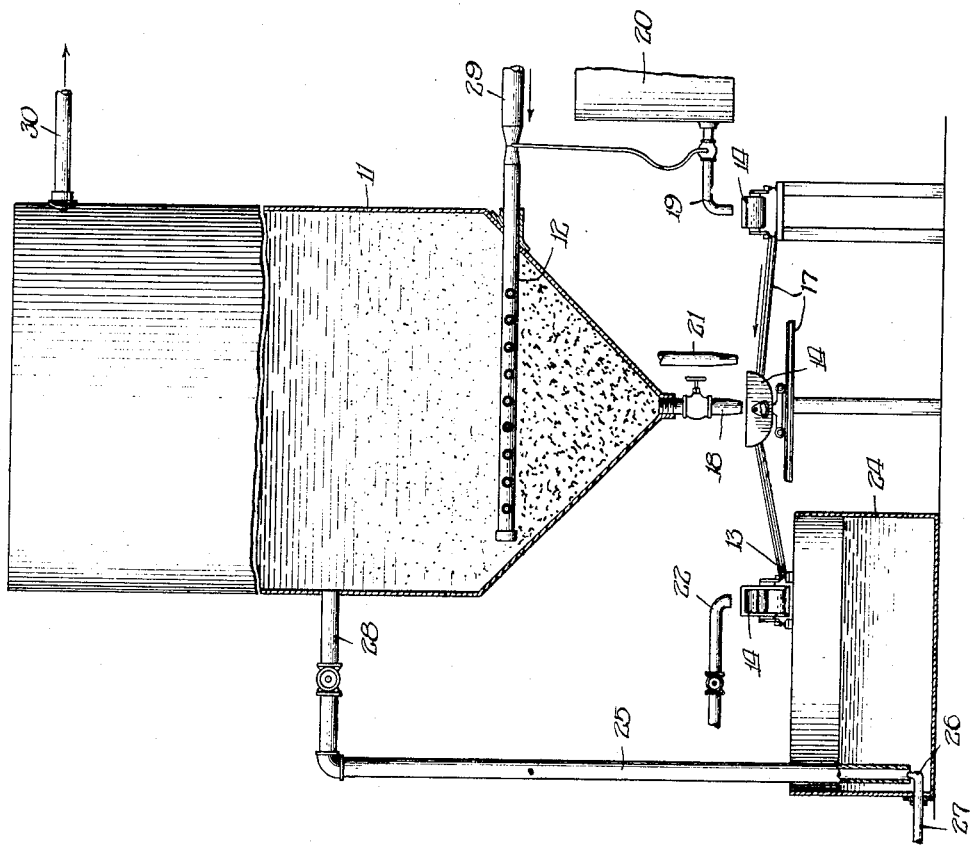
Witness:
R. Burkhardt
Inventor:
Walter H Green,
By Cromwell, Greist & Warden
Attys.

July 4, 1933.  W. H. GREEN  1,916,367
PROCESS FOR SOFTENING WATER
Original Filed July 19, 1924   2 Sheets-Sheet 2
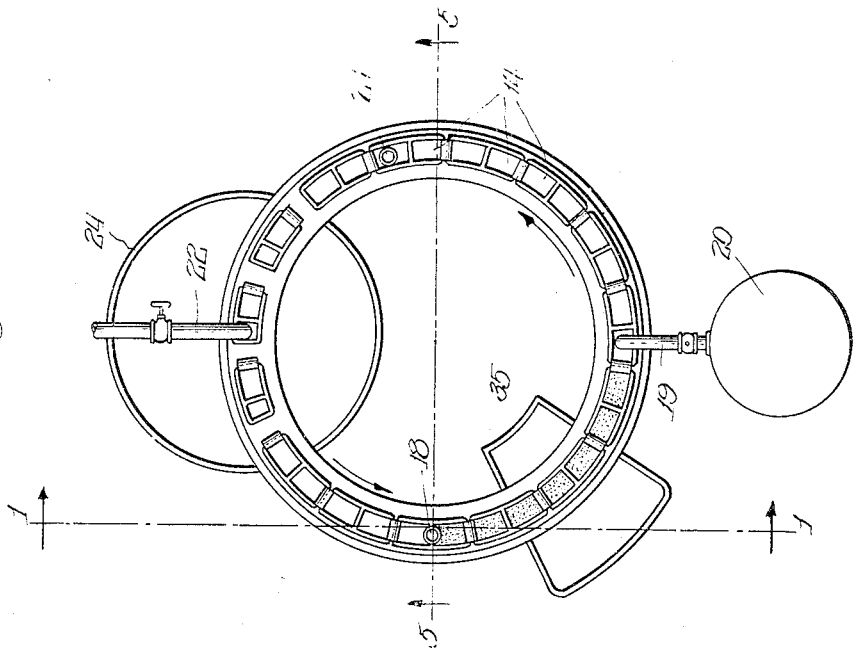
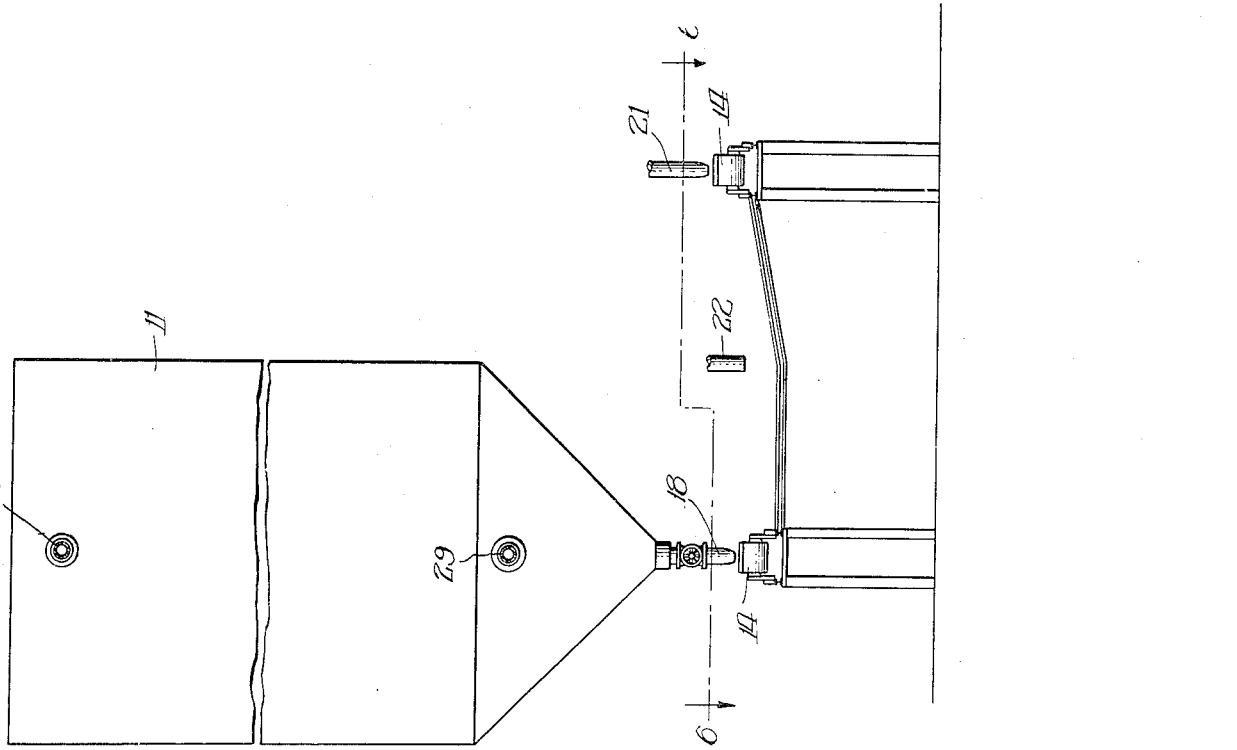
Inventor:
Walter H. Green,
By Cromwell, Greist & Warden
Attys.

Patented July 4, 1933

1,916,367

UNITED STATES PATENT OFFICE

WALTER H. GREEN, OF CHICAGO, ILLINOIS, ASSIGNOR, BY MESNE ASSIGNMENTS, TO THE PERMUTIT COMPANY, OF NEW YORK, N. Y., A CORPORATION OF DELAWARE

PROCESS FOR SOFTENING WATER

Original application filed July 19, 1924, Serial No. 726,930. Divided and this application filed December 13, 1926. Serial No. 154,367.

This invention relates to the art of softening water by the base exchange or zeolite method and has particular reference to procedure for effecting economies in operation and maintenance through better utilization of the zeolites, this application being divided out of my application Serial No. 726,930, filed July 19, 1924.

Heretofore in the softening of water by the base exchange method, it has been customary to provide a casing, either open or closed, supplied with a bed of zeolites disposed on a suitable support, the dimensions of the bed being determined by the hardness of the water to be softened, the quantity of soft water required during a stated period, the density and capacity of the zeolites used, and the rate of flow permissible through the casing. In the operation of a typical softener of the prior art, hard water and a sodium chloride solution for regenerating the zeolites are passed alternately through the bed of zeolites, suitable valves and piping being provided to direct and control the respective flows.

In some cases the flow of hard water and of the regenerating solution has been downward through the zeolites, in other cases upward, and in still other instances the hard water is passed downwardly and the regenerating solution upwardly. Downward softening has been employed in most installations, as the results with upward flow have not been uniform, due to a lack of understanding of the requirements for proper operation. In the exchange of bases which is brought about to soften water, the calcium and magnesium in solution in the water, and which constitute the hardening elements to be eliminated, are withdrawn in passing through a bed of sodium zeolites, the sodium being given up by the zeolites for the calcium and magnesium in the water. In the step of regeneration, sodium is restored to the zeolites, in exchange for the calcium and magnesium taken from the hard water, by passing a solution of sodium chloride through the zeolites. In both cases the exchange results from mere contact and is very rapid, the chief problem heretofore having been to effect contact throughout the bed.

It has been demonstrated that in softeners of the type referred to, certain portions of the bed are more active than others, both in softening and in regeneration. There is involved the problem of channeling or preferential passage of the water after it has entered the bed, thus placing the burden on some parts of the bed more than on others.

The principal object of the invention is to utilize the full capacity of the zeolites, this being accomplished by passing the water upwardly through the zeolites at a rate of flow which will expand the bed sufficiently to place it in suspension.

Another object of the invention is the more effective utilization of the base exchanging properties of the zeolites, by bringing the raw water first into contact with partially exhausted zeolites to remove a portion of the hardness of the water and completely exhausting the zeolites, then subjecting the partially softened water to the action of freshly regenerated zeolites to further remove the hardening elements from the water.

That the process may be better understood, apparatus which might be used in carrying it out is shown in the accompanying drawing and described in the following specification. Obviously other forms of apparatus may be successfully employed and the form illustrated and described is given for purposes of exemplification only and is not to be construed as limiting the scope of the invention as defined by the appended claims.

In the drawings,

Fig. 1 is a vertical section taken diametrically through the apparatus, upon the line 1—1 of Fig. 6.

Fig. 2 is a vertical section taken longitudinally through two of the receptacles used in the regeneration of the zeolites, Fig. 3 is a side elevation of two of the receptacles when at that point on the track where each of the receptacles in turn is tilted, Fig. 4 is a side elevation of two of the receptacles when at that point on the track where each of the receptacles in turn is partially tilted.

Fig. 5 is a side vertical elevation of apparatus upon the line 5—5 of Fig. 6; and Fig. 6 is a plan view of the conveying apparatus upon the line 6—6 of Fig. 5.

The water-softening portion of the apparatus illustrated in Fig. 1 includes a casing 11 having a conical bottom 12 which terminates centrally in a valved outlet 18. A hard water conduit 29 enters the casing 11 adjacent the bottom of the same and is therein provided with a distributor head 12, and a soft water conduit 30 leaves the casing 11 adjacent the top of the same. The exhausted zeolites are withdrawn from the casing through the outlet 18, and, after being regenerated by the zeolite-regenerating portion of the apparatus hereinafter described, are returned to the casing for re-use through a conduit 25. The softening of the water is thus effected in the apparatus by an upward flow of the water through the zeolites, as distinguished from a downward flow.

I have discovered that highly efficient results may be had by an upward flow of the water if the velocity of the flow is such that the zeolites, instead of remaining in a solid filter like bed, are caused to expand and assume a diffused state of suspension by the velocity of the flow, in which state of suspension the volume of the zeolites may be substantially increased, in some cases, approximately doubled.

The zeolites in the casing 11 fill the bottom of the same, when the upward flow of water through the apparatus is stopped to a point above the distributor head 12. When the process is restarted, the water is caused to flow from the distributor head at a velocity sufficient to expand the bed of zeolites above the distributor head and maintain the same in a diffused state of suspension. This action prevents channelling, and brings all of the zeolite grains into complete surface contact with the water. By this process the capacity of the zeolites for softening water is rendered wholly available; the complete softening of the water continues until the material is entirely exhausted; a bed of an increased amount of zeolites may be used without necessitating any substantial increase in the pressure needed to force the water through the zeolite material; and all packing of the bed, with its attendant difficulties, is eliminated.

Furthermore, the raw water being fed through the conduit 29 into the lower end of the tank 11 first comes into contact with zeolites which have been partially exhausted. The raw water at this point containing its maximum amount of hardening elements presents very active materials to the partially exhausted zeolites and thus exhausts them. As the water passes upward through the tank 11, it contains less hardening matter, and more active zeolites are required to further remove the hardening elements. This is accomplished in the example cited by introducing freshly regenerated zeolites through the pipe 28 which is positioned approximately halfway up the tank 11.

Thus, by the process described, the water is presented to the less active zeolites when a portion of the hardening matter is easily removed and to the more active zeolites when the hardening matter is reduced to the point where it is difficult to remove. By this method not only is the full base exchange capacity of the zeolite utilized, but also the hardening elements in the water are removed to the greatest degree possible.

The zeolite-regenerating portion of the apparatus comprises a conveyor 13 which consists of a plurality of wheeled receptacles 14 which are serially linked together and travel about a circular track 17. Each receptacle has a lip 15 at one end which laps over the adjacent end of the adjoining receptacle, and has a transverse baffle 16 between its ends which is spaced from its bottom, whereby, when a liquid is poured into the uppermost of several receptacles which are supported on an inclined portion of the track, the same will flow through each of such receptacles in a tortuous course extending alternately over the lips and below the baffles. Each receptacle 14 is tiltable on its under carriage, and is caused to tilt slightly by the trip 36 when at one place in its journey and is caused to tilt fully by the trip 23 at another place, (see Fig. 3 and 4). Any suitable means may be used for moving the receptacles about the track, and such movement may be either continuous or intermittent, depending upon the manner in which the associated portions of the apparatus are designated to operate. The receptacles pass first under the outlet 18 of the casing 11, where they receive the exhausted zeolites, then down a gradual inclination to over a catch basin 35 which empties into the sewer where the receptacles 14 are caused to tilt slightly by means of the trip 36 (see Fig. 4), then up a gradual inclination to a point below the nozzle 19 of the regenerating solution tank 20, where the zeolites in the receptacles are immersed in the regenerating solution, then up an inclination farther to a point below a nozzle 21 where a stream of water flows into the receptacles and washes the solution from the zeolites, and then to a point below a nozzle 22 where the receptacles are caused to tilt fully in sequence by the catch 23 (shown in Fig. 3) and another stream of water flows into the same and washes therefrom the regenerated zeolites. The zeolites are washed from the receptacles into a receiving tank 24 and are elevated from such tank in the conduit 25 to the casing 11 by means of an injector nozzle 26 on the end of a water conduit 27 (see Fig. 1). The regenerated zeolites are discharged from the upper end of the conduit 28 over the top of the body of zeolites in the softener.

In the ordinary zeolite softener where the bed is regenerated in place, or without removing the same from the container, the bed is customarily composed of zeolite grains of wide variation in size, as for instance between the limits of a 20 and 60 mesh screen, and such range is not objectionable. I have found it advantageous, particularly in apparatus of the type disclosed where the zeolites are put in suspension during the softening operation and where zeolites are withdrawn for regeneration from below the softening zone, to use in each apparatus, grains of approximately the same size, as for instance within a range of ten mesh as against a range of forty or fifty mesh in the ordinary practice. I have also found it advantageous, in softeners of the type where the bed is regenerated in place in the usual manner but where the softening is accomplished by an upward flow of the water through the bed, to use grains of approximately uniform size in each bed.

Delivery of softened water from apparatus operating in accordance with the upward-flow principle may be varied as desired to conform generally with varied rates of consumption, and without changing the proportions of the apparatus and of the contained bed. This is accomplished by using zeolite grains of uniformly small size when a small delivery is desired, and zeolite grains of uniformly large size when a rapid delivery is desired, the object being to employ zeolites of such size that at least a portion of them are in suspension at the normal rate of flow.

I claim:

1. The process of softening water, which comprises passing water to be softened through a quantity of zeolites consisting of grains, the size of a major portion of which are within a range substantially less than 40 to 50 mesh.

2. A process for carrying out an exchange reaction which consists in maintaining the exchange material in a state of suspension in a liquid to be treated until the exchange reaction has been substantially completed by means of the upward flow of the said liquid.

3. A process for the softening of water by base exchange which consists in maintaining the exchange material in a state of suspension in an upward flowing column of hard water, and maintaining the rate of flow of the hard water at such a speed that the exchange material is maintained in suspension for a period long enough for the exchange reaction to be substantially completed.

In testimony whereof I have hereunto subscribed my name.

WALTER H. GREEN.